United States Patent [19]

MacDonald

[11] 4,368,003
[45] Jan. 11, 1983

[54] FOLDABLE FARM IMPLEMENT WITH SINGLE PORT HOPPER-FEEDING AUGER

[76] Inventor: John T. MacDonald, R.R. #2, Box 1634, Paulding, Ohio 45879

[21] Appl. No.: 211,074

[22] Filed: Nov. 28, 1980

[51] Int. Cl.³ .......................... A01B 65/02; B60P 1/40
[52] U.S. Cl. ...................................... 414/523; 111/57; 198/632; 198/666; 414/526
[58] Field of Search ................ 414/523, 526; 198/632, 198/666; 111/57

[56] References Cited

U.S. PATENT DOCUMENTS

| | | |
|---|---|---|
| 1,689,963 | 10/1928 | Pelton . |
| 2,772,767 | 12/1956 | Seifert . |
| 3,014,575 | 12/1961 | Klein . |
| 3,016,128 | 1/1962 | Hacker . |
| 3,337,068 | 8/1967 | Meharry . |
| 3,584,732 | 6/1971 | Tyler . |
| 3,719,268 | 3/1973 | Koehnen . |
| 3,730,332 | 5/1973 | Benzon . |
| 4,137,852 | 2/1979 | Pratt . |

Primary Examiner—Robert G. Sheridan
Attorney, Agent, or Firm—Gust, Irish, Jeffers & Hoffman

[57] ABSTRACT

A front foldable farm implement and hopper-feeding auger comprising an elongated hopper-supporting frame in three separable sections in end-to-end relation. A drawbar is secured to and transversely extends from the central portion of the intermediate section. First means pivotally connects the opposite ends of this central portion to the adjacent ends of the outboard sections, respectively, whereby the outboard sections may be pivoted between a first position in which the three sections are aligned and a second position in which the outboard sections are generally parallel to the drawbar. A plurality of hoppers is carried by the sections. An elongated tubular conveyor in two separable length portions is carried by the two outboard sections, respectively, these length portions being disposed above and in feeding registry with the hoppers. Further, the conveyor extends parallel to the frame sections when the outboard sections are in the first position. The conveyor length portions include two tubular elements which receive two rotary augers, respectively, the adjacent ends of the tubular elements being joined and the augers drivably connected to rotate in unison when the outboard sections are in the first position. The tubular elements are separated and the augers disconnected when the outboard sections are moved to the second position. The tubular elements have material-discharge openings in registry with the hoppers, respectively. A feed port on the outboard end of one conveyor length portion only is provided for introducing flowable granular material into the conveyor which conveys such material through both length portions and to all of the hoppers when the outboard sections are in the first position.

6 Claims, 6 Drawing Figures

FOLDABLE FARM IMPLEMENT WITH SINGLE PORT HOPPER-FEEDING AUGER

BACKGROUND OF THE INVENTION

1. Field of the Invention

The present invention relates to front foldable farm implements and more particularly to such farm implements having in combination therewith a hopper-feeding conveyor which requires only a single material-introducing port.

2. Description of the Prior Art

Front foldable farm implements are well known, typical thereof being the one shown in U.S. Pat. No. 4,137,852. This patent discloses articulated hopper sections which when unfolded to operative position have a conveyor disposed in hopper-feeding relation into which granular material, such as fertilizer or grain, is fed and conveyed to the individual hoppers. This conveyor is in two sections, one supplying a first group of hoppers and the other the remaining hoppers. Each of the conveyor sections have material-introducing ports requiring two separate operations in the loading of the conveyor sections and hoppers. Since the hoppers must be filled frequently, the two separate loading operations become very time consuming and laborious. Other prior art is found in U.S. Pat. Nos. 1,689,963; 2,772,767; 3,014,575; 3,016,128; 3,337,068; 3,584,732; 3,719,268 and 3,730,332.

SUMMARY OF THE INVENTION

In combination, a front foldable farm implement and hopper-feeding auger comprising an elongated hopper-supporting frame in three separable sections in end-to-end relation. A drawbar is secured to and transversely extends from the central of said sections, and the opposite ends of this central section are pivotally connected to the adjacent ends of the outboard sections, respectively. The outboard sections may thus be pivoted between a first, operative position in which the three sections are aligned and a second, transporting position in which the outboard sections are folded forwardly generally parallel to the drawbar. A plurality of hoppers are carried by all three sections. An elongated tubular conveyor in two separable length portions is carried by the two outboard sections, respectively, these length portions being disposed above the hoppers in feeding relation thereto and extending parallel to the frame sections when the outboard sections are in the first position. The conveyor portions include two tubular elements which receive two rotary augers, respectively. The adjacent ends of the tubular elements are joined and the augers are drivably interconnected to rotate in unison when the outboard sections are in the first position and the tubular elements are separated and the augers are disconnected when the outboard sections are in the second position. The tubular elements have material-discharge openings in registry with the hoppers, respectively. A single feeding port is provided on the outboard end of one conveyor length portion only for introducing flowable granular material into the conveyor which is thereby conveyed through both length portions to the hoppers, respectively, when the outboard sections are in the first position. Thus, the hoppers may be filled by feeding material to the conveyor at one location only.

It is an object of this invention to provide an improved foldable farm implement and hopper-feeding auger which is simpler in design and more efficient in operation.

It is another object of such an improved arrangement to provide a conveyor mechanism for feeding a plurality of hoppers which requires loading at one location only.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
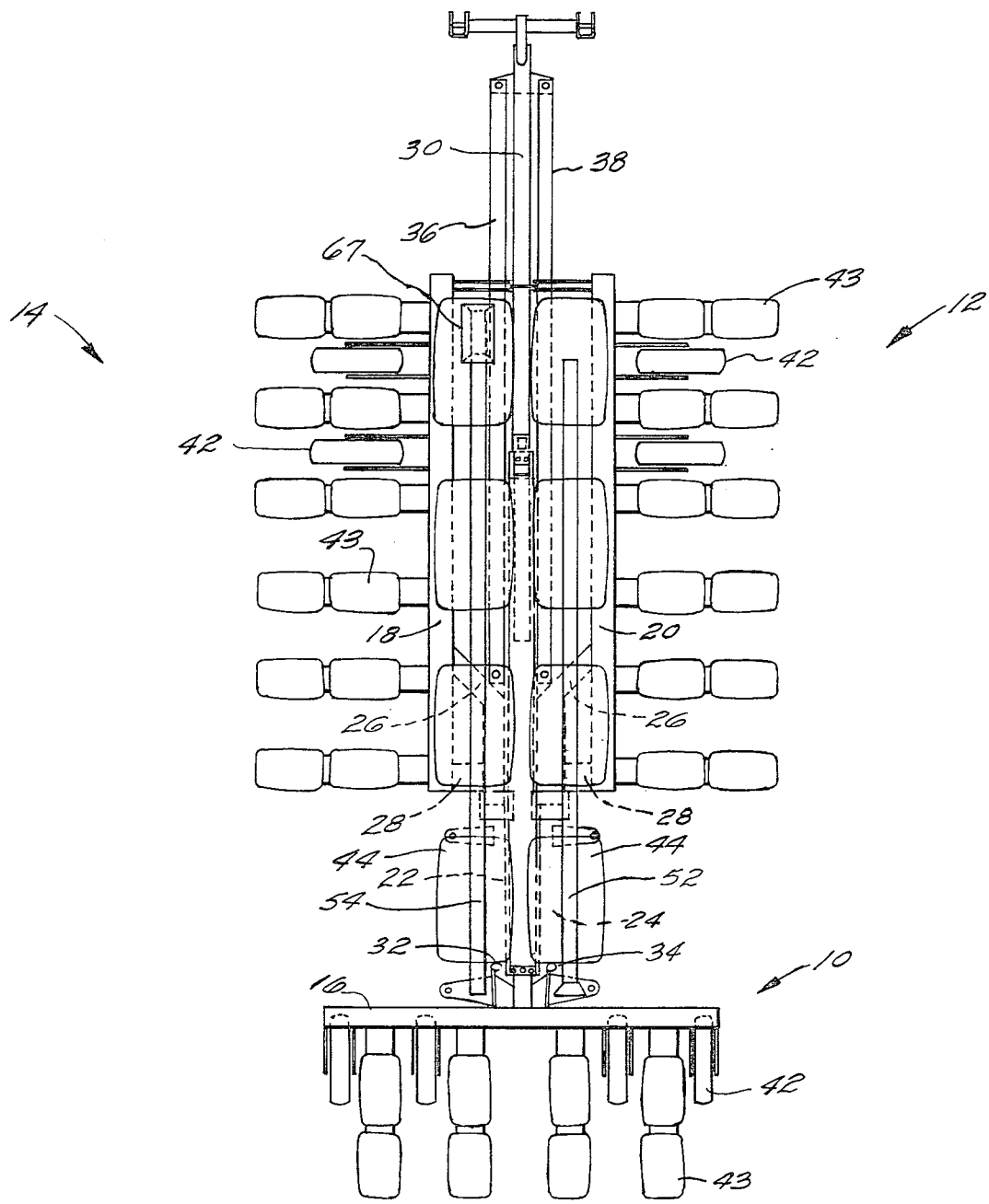
FIG. 1 is a top plan view of an embodiment of this invention shown folded into transport position.
Figure 2:
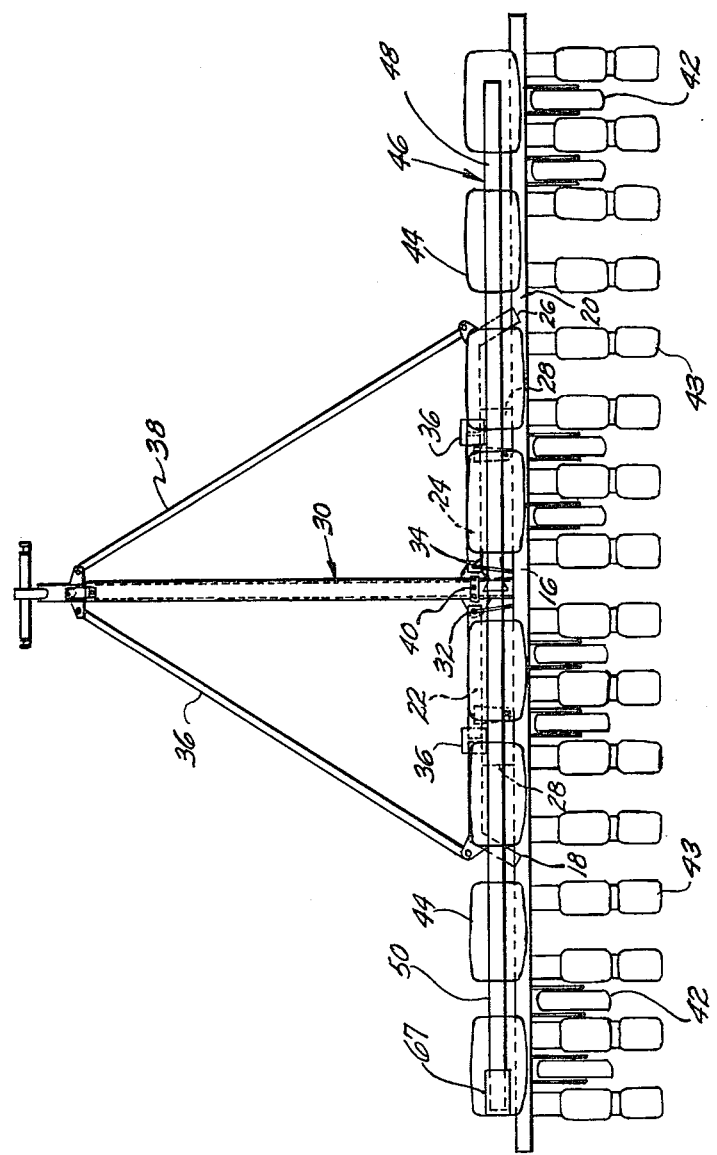
FIG. 2 is a similar view of the same embodiment but unfolded into operative position.
Figure 3:
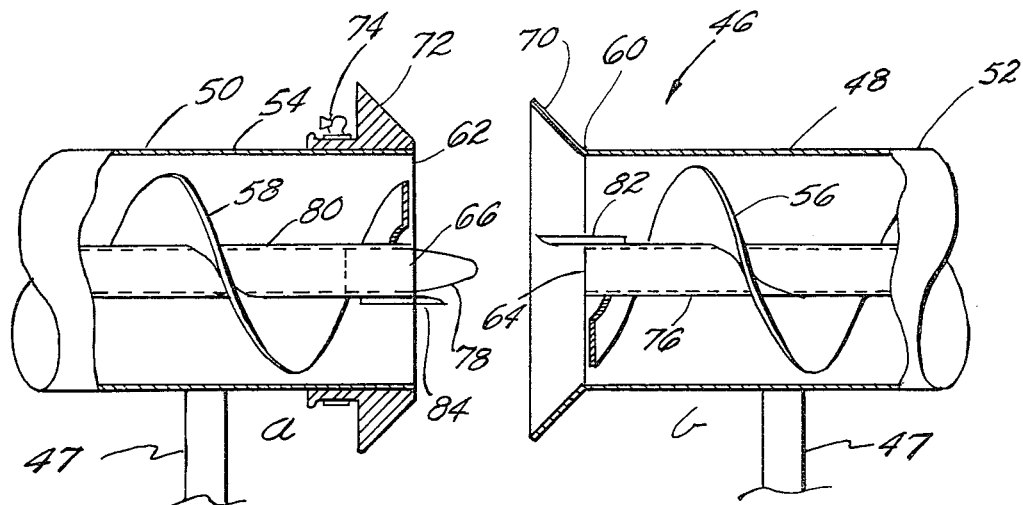
FIG. 3 is fragmentary view of connectable end portions of two separable lengths of a typical auger conveyor, these ends portions being partially sectioned longitudinally for clarity of illustration.

Referring to the drawings, and more particularly to FIGS. 1 and 2, the farm implement is shown as being in three operative sections 10, 12 and 14 which are pivotally interconnected so as to be foldable to a first transport position as shown in FIG. 1 and unfoldable to a second operative position as shown in FIG. 2. The three sections 10, 12 and 14 comprise elongated frame portions 16, 18 and 20, respectively, which are in end-to-end relation when disposed in operative position as shown in FIG. 2. Two additional elongated outboard frame members 22 and 24 are secured to and in parallelism with respective outboard frame sections 18 and 20 by means of gussets 26 and 28. A drawbar 30 lies between and extends parallel to the outboard frame sections 18, 22 and 20, 24 and is secured at its rear end to the mid portion of the central frame section 16 as shown. The rearmost ends of the frame members 22 and 24 are pivotally connected to the rear end of the drawbar 30 at a location spaced forwardly of the frame section 16 by means of suitable pivot pins 32 and 34. Two auxiliary draw struts parallel the drawbar 34 when the implement is folded as shown in FIG. 1 and are pivotally connected to the drawbar 34 at the forward end thereof. The rear ends of these struts 36 and 38 are also pivotally connected to the outboard frame sections 18, 22 and 20, 24 respectively, as shown.

The drawbar 34 itself is made in two telescoping parts which are latched together by means of a pin 40 when the implement is unfolded to its operative position of FIG. 2. For folding the implement, the pin 40 is withdrawn thereby freeing the telescoping parts permitting the drawbar 34 to lengthen as shown in FIG. 1.

Transport wheels 42 and hopper 43 are mounted to the various frame sections 16, 18 and 20 and hoppers 44 on frame sections 18 and 20.

The apparatus described in the foregoing is identical to that disclosed in U.S. Pat. No. 4,137,852 which discloses features and elements not particularly germain to the invention hereof but which are included herein by reference as to the details and arrangement of construction and components. In the aforesaid patent, an auger type conveyor is utilized for filling the various hoppers mounted on the outboard frame sections, this conveyor being in two individually operable and spaced apart sections, each having a loading port located at the opposite extremities of the two outboard sections thereby requiring that the conveyor be filled from these two different locations. The present invention utilizes a different conveyor arrangement which necessitates loading from only one location on the implement.

Figure 4:
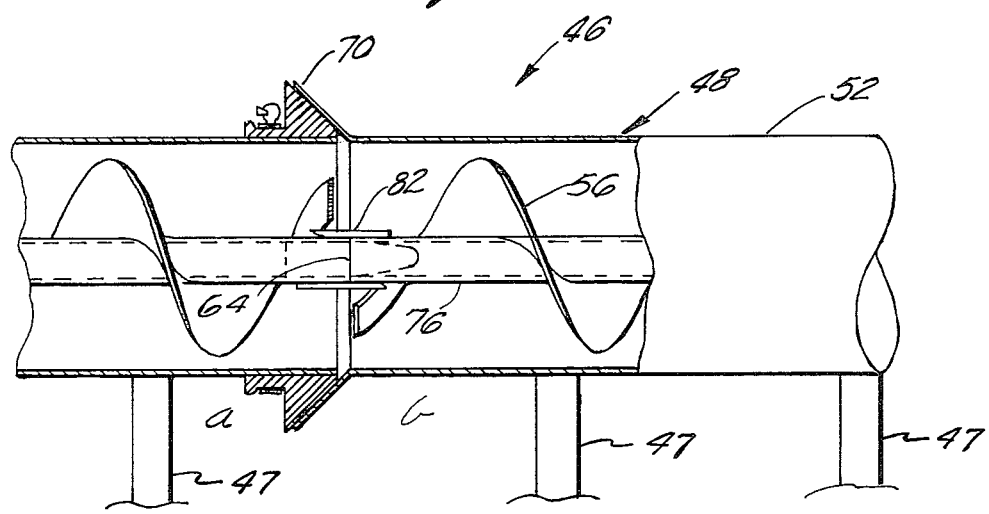
FIG. 4 is a view like FIG. 3 but with the end portions joined in operative position.
Figure 5:
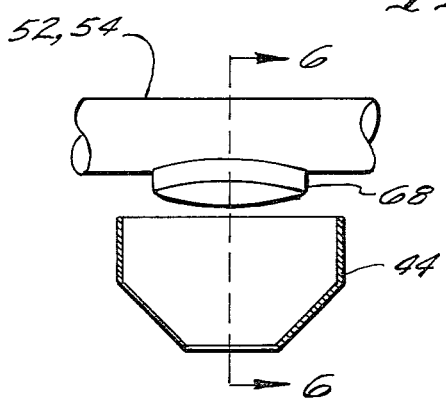
FIG. 5 is a fragmentary end view showing the relationship of a section of the conveyor and a hopper in feeding relation therewith.
Figure 6:
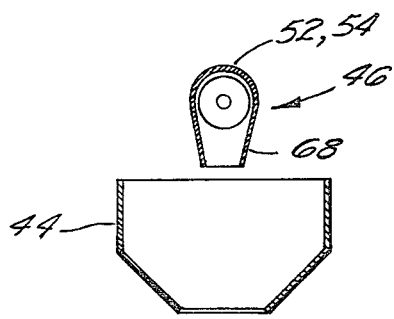
FIG. 6 is a sectional view taken substantially along section line 6—6 of FIG. 5.

A single auger-type conveyor indicated generally by the numeral 46 is rigidly mounted by brackets 47 on the outboard frame sections 18, 22 and 20, 24 in parallelism therewith but spaced above in feeding relation to the plurality of hoppers 44. This conveyor 46 is in two, separable length portions 48 and 50 which include two tubular elements 52 and 54 each having therein a rotary auger 56 and 58. With the implement unfolded to its operative position of FIG. 2, the adjacent ends 60 and 62 of the tubular elements 52 and 54 are engaged in sealed relation (FIG. 4) and the two ends 64 and 66 of the two augers 56 and 58 are connected together such that rotation of one imparts the same rotation to the other. Thus, this provides a single auger type conveyor 46 which extends the full length of the implement as shown in FIG. 2. At one end of the conveyor 46 and on the left as shown in FIG. 2, a conveyor-loading port 67 is provided into which granular material to be conveyed by the conveyor 46 from one end to the other may be introduced. Since the function of the conveyor 46 is to fill the various hoppers 44, each of the tubular elements 52, 54 is provided with a plurality of elongated nozzle portions 68 disposed immediately above respective ones of the hoppers 44 as shown in FIGS. 5 and 6. As material is conveyed within the respective tubes 52 and 54 by means of the augers 56 and 58, the direction of this conveying being from left to right as viewed in FIG. 2, the granular material discharges from the nozzle 68 filling the hoppers 44 in sequence from left to right (FIG. 2). The nozzles 68 are sufficiently close to the hopper tops that the nozzle openings are closed by the material filled to the hopper tops. This is conventional.

In order to accomodate the forward folding of the implement to the position shown in FIG. 1, the conveyor sections 48 and 50 are individually mounted on the outboard sections 12 and 14, respectively by brackets 47. In the folded, transport position, the auger sections 52 and 54 occupy the position shown in FIG. 1. When the implement is unfolded to its operative position of FIG. 2, the adjacent ends of the conveyor sections 48 and 50 join thereby forming a single conveyor mechanism as previously explained (see FIG. 4).

To accomodate the alternative joining and separation of the conveyor section ends, the end 60 of the tubular element 52 is outwardly flared to the funnel shape 70 shown. On the end portion of the tubular element 54, an annular gasket 72 of resilient material, such as foam plastic, is secured, a screw type clamping band 74 being used for the purpose. This gasket 72 is in cross section of such shape as will sealingly merge with the inner wall of the funnel shaped end 70 of the tubular element 52.

The driving connection between the adjacent end portions of the two auger sections 56 and 58 includes a hollow shaft 76 for the auger 56. The shaft 80 of the auger 58 has an axially projecting pin 78 rigidly secured thereto, this pin 78 being received by the hollow shaft 76 when the two conveyor sections 48 and 50 are joined. This aligns the two shafts 76 and 80. For imparting rotation from one auger section 48 to the other section 50, two fingers 82 and 84 are suitably secured to the outer peripheries of the two shafts 76 and 80, as by welding, to project axially beyond the ends thereof as shown. When the two auger sections are joined, rotation of one of the augers 56, for example, will carry the finger 82 around until it engages the other finger 84 on the shaft 80 thereby rotating the auger section 58. In the farm implement, it makes no difference as to which of the auger sections has the primary driving power connected thereto.

It will now be noted that when the implement is unfolded from its transport position of FIG. 1 to the operative position of FIG. 2, the auger sections 48 and 50 will join providing a suitable seal between the two tubular elements 52 and 54 and a driving connection between the auger sections 56 and 58.

When it becomes necessary to reload the hoppers 44, it is only necessary to introduce the granular material, such as fertilizer, grain or the like, into the single loading port 67. This is in sharp contrast with the time consuming and inefficient arrangement of the apparatus shown in the aforesaid U.S. Pat. No. 4,137,852 wherein loading had to be accomplished at the opposite ends of the implement which required at least twice the labor as involved in loading this invention.

While there have been described above the principles of this invention in connection with specific apparatus, it is to be clearly understood that this description is made only by way of example and not as a limitation to the scope of the invention.

What is claimed is:

1. In combination, a foldable farm implement and hopper-feeding auger comprising an elongated hopper-supporting frame in three separable sections in end-to-end relation, a draw bar secured to and transversely extending from the central of said sections, first means pivotally connecting the opposite ends of said central section to the adjacent ends of the outboard sections, respectively whereby said outboard sections may be pivoted between a first position in which said three sections are aligned and a second position in which said outboard sections are generally parallel to said draw bar, a plurality of hoppers carried by said sections, an elongated tubular conveyor in two separable length portions carried by said two outboard sections, respectively, said length portions being disposed above said hoppers in feeding relation thereto and extending parallel to said frame sections when said outboard sections are in said first position, said conveyor portions including two tubular elements which receive two rotary augers, respectively, the adjacent ends of said tubular elements being joined and said augers drivably connected to rotate in unison when said outboard sections are in said first position and said tubular elements being separated and said augers disconnected when said outboard sections are in said second position, said tubular elements having material-discharge openings in register with said hoppers, respectively, and second means on the outboard end of one conveyor length portion only for introducing flowable granular material into said conveyor which conveys such material through both length portions to said hoppers, respectively, when said outboard sections are in said first position.

2. The combination of claim 1 wherein one end of said tubular elements is received within the end of the other tubular element when said elements are joined, and third means for sealing said ends against leakage of material being conveyed from one tubular element to the other.

3. The combination of claim 2 wherein the end of said other elements is funnel shaped to provide an opening of larger diameter than said one end, said third means being an annular gasket secured to the outer periphery of said one end, said gasket being of resilient material of such shape as peripherally engages and seals against the inner wall of said funnel shaped end.

4. The combination of claim 3 wherein said gasket is wedge shaped in cross-section to complement the shape of the space between said funnel shaped end and said one end, and a clamping band securing an end portion of said gasket to said one end.

5. The combination of claim 1 wherein the connecting ends of said augers have separable male and female fittings which mate when said auger ends are connected and separate when said auger ends are disconnected, said female fitting being a socket in the end of one auger shaft, said male fitting being a projection on the end of the other auger shaft which fits into said socket, and two fingers on said shaft ends, respectively, which axially project therebeyond and which are laterally engageable to impart rotation of one auger shaft to the other.

6. In combination, a foldable farm implement and hopper-feeding auger comprising an elongated hopper-supporting frame in a pair of outboard sections, a drawbar secured to and transversely extending from said frame, first means pivotally connecting the ends of said outboard sections to a central portion of said frame whereby said outboard sections may be pivoted between a first position in which said sections are aligned and a second position in which said outboard sections are generally parallel to said draw bar, a plurality of hoppers carried by said sections, an elongated tubular conveyor in two separable length portions carried by said two outboard sections, respectively, said length portions being disposed above said hoppers in feeding relation thereto and extending parallel to said frame sections, said conveyor portions including two tubular elements which receive two rotary augers, respectively, the adjacent ends of said tubular elements being joined and said augers drivably connected to rotate in unison when said outboard sections are in said first position and said tubular elements being separated and said augers disconnected when said outboard sections are in said second position, said tubular elements having material-discharge openings in register with said hoppers, respectively, and second means on the outboard end of one conveyor length portion for introducing flowable granular material into said conveyor which conveys such material through both length portions to said hoppers, respectively, when said outboard sections are in said first position.

* * * * *